United States Patent [19]

Gass

[11] 4,154,196
[45] May 15, 1979

[54] ANIMAL METABOLISM UNIT

[75] Inventor: George H. Gass, Carbondale, Ill.

[73] Assignee: Southern Illinois University Foundation, Carbondale, Ill.

[21] Appl. No.: 779,042

[22] Filed: Mar. 18, 1977

[51] Int. Cl.$^2$ .............................................. A01K 1/03
[52] U.S. Cl. ..................................................... 119/17
[58] Field of Search .................... 119/1, 15, 17, 18, 22

[56] References Cited

U.S. PATENT DOCUMENTS

| | | | |
|---|---|---|---|
| 2,684,051 | 7/1954 | Leblond et al. | 119/17 |
| 3,227,139 | 1/1966 | Gass et al. | 119/17 |
| 3,626,902 | 12/1971 | Orfei | 119/15 |

*Primary Examiner*—Louis G. Mancene
*Assistant Examiner*—Robert P. Swiatek

*Attorney, Agent, or Firm*—Koenig, Senniger, Powers and Leavitt

[57] ABSTRACT

An animal metabolism unit, for encaging a test animal and collecting and separating matter excreted by the animal, comprising a cage having a foraminous bottom, a funnel below the cage for receiving excreted matter passing through the bottom, a deflector in the funnel over the discharge opening of the funnel, a conical skirt at the lower end of the funnel having an upwardly opening annular channel around the inside thereof for collecting liquid matter flowing down on the interior of the skirt from the funnel, the channel surrounding a central opening, and a receptacle for collecting solid excreted matter removably fitted in the opening. A stand supports the cage in an elevated position and permits substantially instant access to the separated liquid and solid excreted matter.

10 Claims, 6 Drawing Figures

ANIMAL METABOLISM UNIT

BACKGROUND OF THE INVENTION

This invention relates to animal metabolism units, and more particularly to a device for encaging a test animal, such as a mouse, a rat, a hamster, a guinea pig or a rabbit, and collecting and separating liquid and solid matter excreted by the encaged animal.

The animal metabolism unit of this invention is an improvement upon the prior animal metabolism unit disclosed in U.S. Pat. No. 3,227,139 of myself and Charles A. Bunten, issued Jan. 4, 1966.

In said prior unit, a cage having a funnel therebelow is mounted in a container. Excreted liquid and solid matter are separated by means of a bulbous deflector at the lower end of a rod extending down through the lower end of the funnel. Liquid flows down on the exterior surface of this deflector (which is outside the funnel) to drip into a receptacle in the container resting in the bottom of the container. Solid matter is deflected outwardly from the liquid collector by the deflector and collects in the container on the bottom of the container. This prior unit, while generally satisfactory, may in certain instances present the problem of undue evaporation of liquid from the relatively large surface of the bulbous deflector, and some inconvenience in that the cage proper must be removed from the container for access to the receptacle for liquid matter and also for removal of the solid matter collected in the container.

SUMMARY OF THE INVENTION

Accordingly, among the several objects of the invention may be noted the provision of an improved animal metabolism unit of the general class shown in the aforesaid U.S. Pat. No. 3,227,139 adapted efficiently to separate and collect liquid and solid matter excreted by the encaged animal without undue evaporation of the liquid matter; the provision of an improved unit of this class having less exposed surface area over which the liquid must flow for its separation and collection to reduce loss by evaporation; the provision of a unit of the class described wherein a receptacle for collection of liquid matter and a receptacle for collection of solid matter are in the open and instantly accessible for removal from association with the unit without having to remove the cage.

In general, a metabolism unit of this invention for encaging a test animal and collecting matter excreted by the animal comprises a cage having a foraminous bottom for passage of excreted matter therethrough, a funnel below the cage for receiving excreted matter passing through the bottom of the cage, said funnel having a discharge opening at its lower end, a deflector in the funnel over the discharge opening, and means for separating liquid and solid excreted matter exiting from the lower end of the funnel. The latter means comprises a hollow conical skirt at the lower end of the funnel, said skirt flaring outwardly from the lower end of the funnel and having an upwardly opening annular channel around the inside thereof for collecting liquid matter flowing down on the interior surface of the skirt from the lower end of the funnel. This annular channel has a drain for drainage of liquid matter therefrom and is sloped for flow of liquid matter to the drain. The annular channel surrounds a central opening, and a receptacle for collecting solid excreted matter is removably received in this central opening, said receptacle being open at its upper end for receiving solid excreted matter exiting from the lower end of the funnel and having its upper end spaced from the interior surface of the skirt for the flow of liquid matter on the interior surface of its skirt to said channel. The metabolism unit also includes means for supporting the cage in an elevated position and for permitting substantially instant access to the separated liquid and solid excreted matter.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
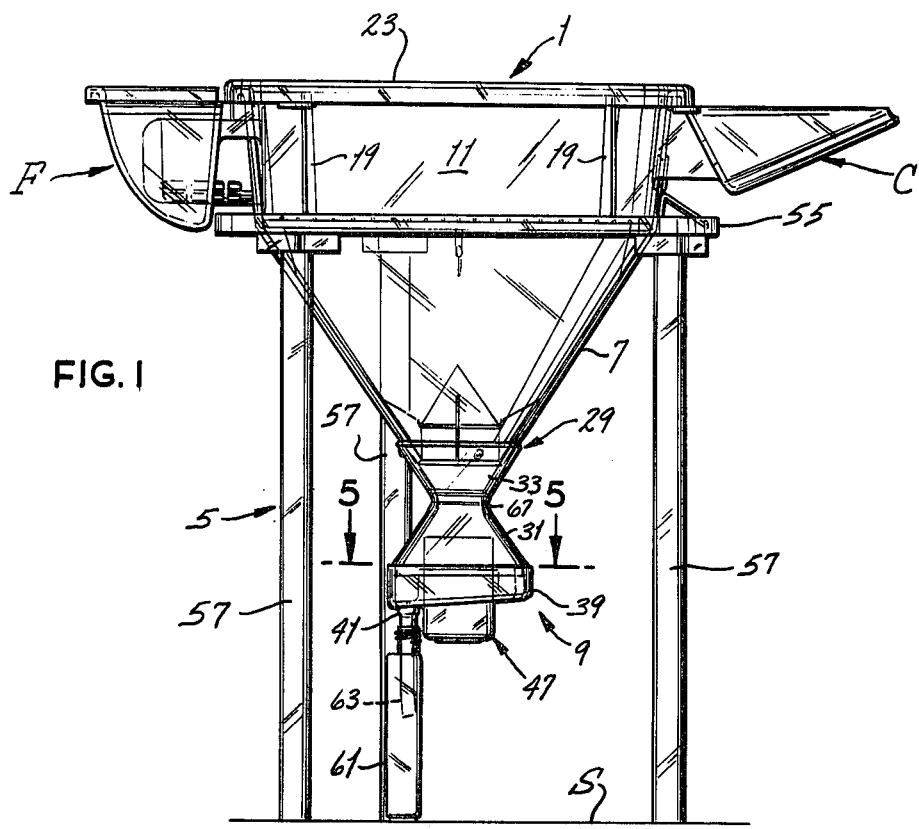
FIG. 1 is a view in elevation of an animal metabolism unit of this invention.
Figure 2:
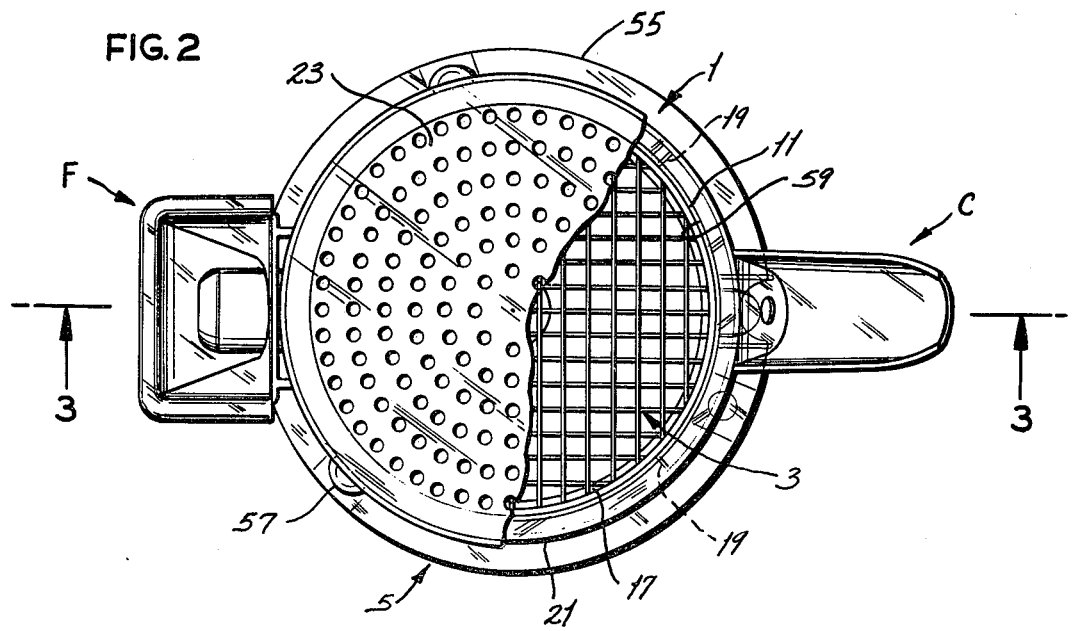
FIG. 2 is a plan of FIG. 1.

Referring to the drawings, an animal metabolism unit of this invention is shown to comprise a cage indicated generally at 1 having a foraminous bottom 3 for passage therethrough of liquid and solid matter (urine and feces) excreted by a test animal housed in the cage. Means indicated generally at 5 is provided for supporting the cage in an elevated position so as to provide space for a funnel 7 below the cage for receiving excreted matter passing through the bottom of the cage. Means of this invention for collecting and separating liquid and solid excreted matter exiting from the lower end of the funnel is indicated generally at 9.

The cage 1 comprises an annular wall 11 formed integrally with the funnel extending up from the upper end (the large end) of the funnel. This wall and the funnel are preferably integrally formed of a transparent plastic, such as an acrylic plastic, adapted to withstand a reasonable temperature. Wall 11, as shown, flares slightly outwardly from the upper end of the funnel. The funnel is of inverted conical shape, open at its top and bottom. The discharge opening at the bottom or lower end of the funnel is designated 13. The funnel has lugs 15 spaced at intervals around its upper end on the inside of its conical wall for supporting the foraminous bottom 3 of the cage, which comprises a circular grid of suitable wire mesh, e.g. one-half inch mesh, having a circular wire rim 17 removably seated on the lugs 15.

The annular wall 11 of the cage 1 has reinforcing ribs 19 extending vertically on its outside, and an outwardly projecting rim 21 at the top. A perforated lid 23, which is preferably made of the same plastic as the wall 11 and funnel 7, snaps on over this rim.

The wall 11 carries a suitable feeding unit F and a suitable cradle C for a standard watering bottle, details of which are not critical insofar as the present invention is concerned.

A deflector 25 is removably mounted in the funnel adjacent its lower end over the discharge opening 13 to deflect excreted matter (liquid or solid) which may fall in line with the opening 13 from falling directly through the opening. As illustrated, this deflector 25 comprises a conical member (which may be formed of plastic like the cage and funnel) similar to the deflector 137 shown in U.S. Pat. No. 3,227,139 removably seated on ribs 27 similar to the ribs 133 shown in said patent. Thus, there may be four of these ribs on the inside of the funnel at its lower end spaced at 90° intervals around the vertical axis of the funnel, and these ribs may be notched as indicated at 28 for centering the deflector. As in U.S. Pat. No. 3,227,139 the diameter of the bottom of the conical deflector is greater than the diameter of the discharge opening 13 but less than the diameter of the funnel at the level of the bottom of the deflector so that there are spaces between the periphery of the bottom of the deflector and the inside surface of the funnel (and between the ribs 27) for passage of excreta (liquid or solid).

The means 9 for collecting and separating liquid and solid excreted matter exiting from the lower end 13 of the funnel 7 comprises a member generally designated 29 made of plastic like the funnel 7 of a form resembling an hour glass, and comprising a hollow conical skirt 31 at the lower end of the funnel having an upper section 33 of inverted hollow conical form fitting on the outside of the lower end portion of the funnel. The skirt 31 flares outwardly from the lower end of the upper section 33 and thus flares outwardly from the lower end of the funnel. The hourglass-shaped member 29 is removably secured on the lower end of the funnel by interengageable snap fastener means comprising projections or bosses 35 formed on the outside of the lower end portion of the funnel fitting in indentations 37 on the upper section 33 of the member 29 adjacent the upper rim of the latter. There may be three such projections and three such indentations, for example, spaced at 120° intervals around the lower end portion of the funnel.

Figure 3:
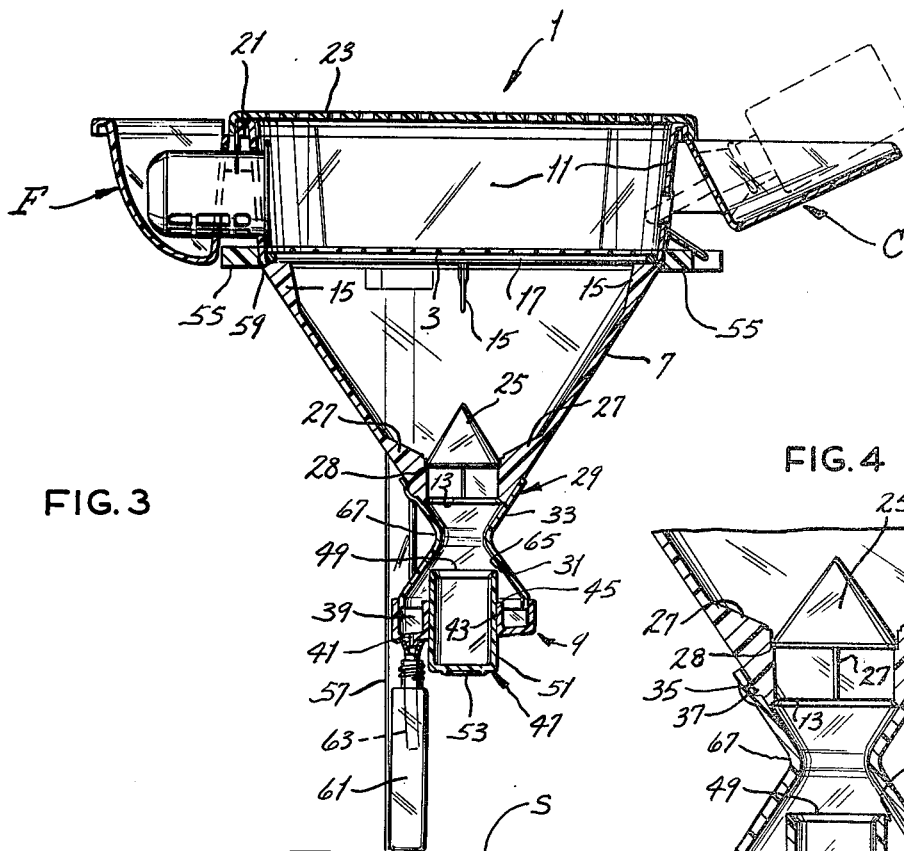
FIG. 3 is a vertical section on line 3—3 of FIG. 2.
Figure 4:
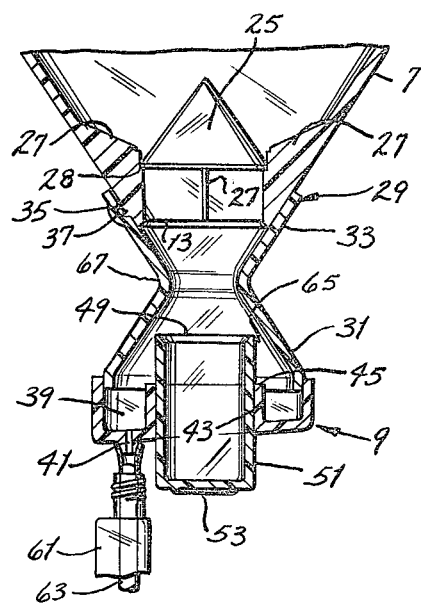
FIG. 4 is an enlarged fragment of FIG. 3.
Figure 5:
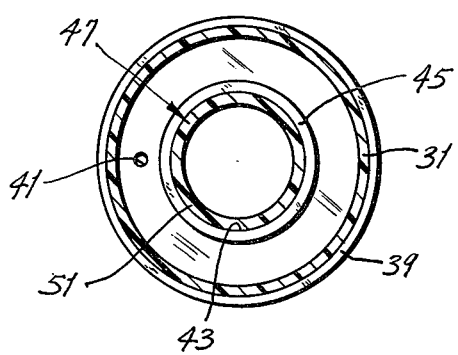
FIG. 5 is a horizontal section on line 5—5 of FIG. 1.

Member 29 is provided with an annular trough-shaped portion 39 at the lower end of the skirt 31 providing an upwardly opening annular channel around the inside of the skirt for collecting liquid matter flowing down on the interior surface of the skirt from the open lower end 13 of the funnel 7. This channel may be formed as a separate part from member 29 proper, and suitably secured to the lower end of the skirt 31, or it may be formed integrally with the skirt as an integral part of the member 29. It may be fitted on the lower end of the skirt as shown in FIGS. 3 and 4, and made removable or permanently bonded in place. In any event, the annular channel 39 has a drain 41 for drainage of liquid matter therefrom and is sloped as appears in FIGS. 1, 3 and 4 for flow of liquid to the drain.

The annular channel 39 surrounds a central opening 43, the latter being bounded by the upwardly directed interior annular flange or lip 45 of the annular channel. Removably received in this central opening 43 of the annular channel is a receptacle 47 open at its upper end 49 for receiving and collecting solid excreted matter exiting from the lower end 13 of the funnel. The receptacle has a cylindrical wall 51 dimensioned for a sliding telescopic fit in the opening 43, and a bottom 53. It is adapted to be slid upwardly into the opening 43 to a point where its open upper end 49 is above the upper edge of the flange 45 but below and spaced from the interior surface of the skirt 31 for flow of liquid matter on the interior of the skirt without interference from the upper end of the receptacle into the channel 39.

The means 5 for supporting the cage in an elevated position is in the form of a stand comprising a platform constituted by a ring 55 on legs 57 (three legs spaced at 120° intervals around the ring being shown). The lower end of the annular wall 11 of the cage 1 has a loose fit in the circular opening 59 in the ring and the lower ends of the ribs 19 on the wall 11 bear on the ring to support the cage in the opening 59 with the funnel 7 extending down below the ring. The legs 57 of the stand are of such length in relation to the height of the funnel 7 and the collecting means 9 at the lower end of the funnel that the channel 39 of means 9 is spaced well above the surface S (e.g., a table surface) on which the stand is placed. This provides room for placement on the surface S below the drain 41 of the channel 39 of a bottle 61 which constitutes means for collecting liquid matter draining out of the drain 41. Thus, means 9 supports drain 41 in an elevated position so as to provide room below said drain for bottle 61. The drain may be formed with a nipple for attachment of a short length of tubing 63 for conducting the liquid matter from the drain into the bottle.

In the utilization of the cage 1 as above described in conjunction with the stand 5, the cage is seated in the ring 55 with the funnel extending down below the ring and with the lower end of the collecting and separating means 9 above the stand-supporting surface S. The legs 5 of the stand are sufficiently widely separated (ring 55 typically has an inside diameter of about eight inches) for reaching in between two legs for placement of bottle 61 in position for receiving drainage from the channel 39 of the collector and separating means 9, and for removal of the receptacle 47 from the means 9 (and for removal of the bottle and the receptacle). As noted above and as shown in FIGS. 1 and 3, the receptacle 47 is telescopically fitted in the opening 43 in the annular channel 39 with the upper end 49 of the receptacle above the upper edge of the flange 45 but below and spaced from the skirt 31, this spacing being indicated at 65.

Liquid matter excreted by an animal in the cage 1 passes through the foraminous bottom 3 of the cage and impinges on the interior surface of the funnel 7 either directly or via the deflector 25, flows down on the interior surface of the funnel, exits through the lower end 13 of the funnel, impinges on the interior surface of the upper section 33 of member 29, flows down this surface to the constricted neck portion 67 of member 29, then flows down on the interior surface of the skirt 31 (clinging to this surface) through the space 65 between the upper end 49 of the receptacle 47 and the skirt into the channel 39, and drains out of the channel through drain 41 into the bottle 61. The neck 67 of member 29 is of smaller diameter than the lower end 13 of the funnel (see FIGS. 3 and 4) in order that liquid exiting from the lower end of the funnel will impinge on the interior surface of upper section 33 of member 29. Evaporation of liquid matter is substantially reduced in respect to the prior device of U.S. Pat. No. 3,227,139, wherein liquid flows down on the exterior surface of the bulbous deflector (53 or 141) below and outside of the funnel. Also, the bottle 61 containing a specimen is instantly accessible for removal without having to remove the cage, and another bottle may be quickly positioned for receiving the next specimen.

Solid matter excreted by an animal in the cage 1 passes through the foraminous bottom 3 of the cage and is funneled by the funnel 7 into the receptacle 47. The latter (containing the solid excreta) is instantly accessible for removal without having to remove the cage, being readily slidable downward and out of the annular channel 39, and another receptacle may be quickly inserted in place for receiving the next solid excreta specimen.

Thus, means 9 also constitutes means for permitting substantially instant access to the liquid excreted matter collected by annular channel 39 and to the solid excreted matter contained in receptacle 47.

Figure 6:
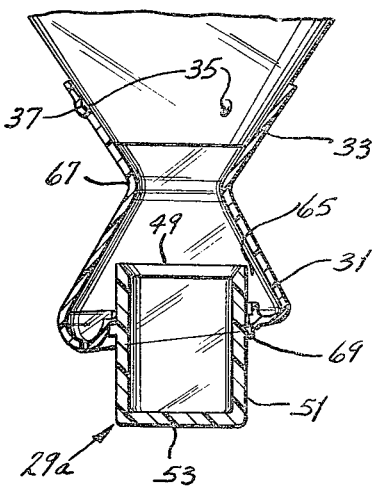
FIG. 6 is a view showing a modification.

FIG. 6 shows a modification designated 29a of the member 29 above described, differing from member 29 in that the annular channel 39 is integral on skirt 31, and in that the receptacle 47 has a means constituted by integral collar 69 at a predetermined position between the top 49 and bottom 53 of the receptacle engageable with the channel 39 in the manner shown in FIG. 6 to limit the degree of upward insertion of the receptacle centrally in the channel to predetermine the width of the space 65 between the upper end of the receptacle and the skirt 31.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A metabolism unit for encaging a test animal and collecting matter excreted by the animal comprising
    a cage having a foraminous bottom for passage of excreted matter therethrough,
    a funnel below the cage for receiving excreted matter passing through the bottom of the cage, said funnel having a discharge opening at its lower end,
    a deflector in the funnel over said discharge opening,
    means for separating liquid and solid excreted matter exiting from the lower end of the funnel, and means for supporting the cage in an elevated position and for permitting substantially instant access to the separated liquid and solid excreted matter,
    said separating means including a hollow conical skirt at the lower end of the funnel, said skirt flaring outwardly from the lower end of the funnel and having an upwardly opening annular channel around the inside thereof for collecting liquid matter flowing down on the interior surface of the skirt from the lower end of the funnel, said annular channel having a drain for drainage of liquid matter therefrom and being sloped for flow of liquid matter to the drain, said annular channel surrounding a central opening, and a receptacle for collecting solid excreted matter removably received in said central opening, said receptacle being open at its upper end for receiving solid excreted matter exiting from the lower end of the funnel and having its upper end spaced from the interior surface of the skirt for the flow of liquid matter on the interior surface of the skirt to said channel.

2. A metabolism unit as set forth in claim 1 wherein the receptacle is telescopically slidable in said central opening.

3. A metabolism unit as set forth in claim 2 wherein the receptacle has means engageable with the channel to limit the degree of insertion of the receptacle in the channel to predetermine the width of the space between the upper end of the receptacle and the skirt.

4. A metabolism unit as set forth in claim 1 wherein the skirt has an upper section of inverted hollow conical form fitting on the outside of the lower end portion of the funnel and wherein the drain of the annular channel is supported in an elevated position so as to provide room below the drain for means for collecting liquid matter draining out of said drain.

5. A metabolism unit as set forth in claim 4 wherein said upper section and skirt together are generally of hourglass shape with a neck at their juncture, said neck being narrower than the lower end of the funnel.

6. A metabolism unit as set forth in claim 4 wherein said upper section of the skirt and the lower end portion of the funnel have interengageable fastener means for removably attaching said upper section to said lower end portion of the funnel.

7. A metabolism unit as set forth in claim 6 wherein said interengageable fastener means comprises snap fastener means.

8. A metabolism unit as set forth in claim 6 wherein the skirt, upper section and channel are integral.

9. A metabolism unit as set forth in claim 6 wherein said skirt and upper section are integral and said channel is a separate part secured to the skirt.

10. A metabolism unit as set forth in claim 9 wherein the channel is removably secured to the skirt.

* * * * *